(12) United States Patent
Iizuka

(10) Patent No.: US 6,714,332 B2
(45) Date of Patent: Mar. 30, 2004

(54) SCANNING OPTICAL SYSTEM

(75) Inventor: Takashi Iizuka, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/260,410

(22) Filed: Oct. 1, 2002

(65) Prior Publication Data
US 2003/0067665 A1 Apr. 10, 2003

(30) Foreign Application Priority Data
Oct. 2, 2001 (JP) .................................. 2001-306085

(51) Int. Cl.$^7$ .................................................. G02B 26/08
(52) U.S. Cl. ........................ 359/208; 359/205; 359/216
(58) Field of Search .............................. 359/205–208, 359/216; 347/258–261, 243–244

(56) References Cited

U.S. PATENT DOCUMENTS

| 5,572,353 A | 11/1996 | Iizuka et al. |
| 5,604,622 A | 2/1997 | Iizuka et al. |
| 5,648,865 A | 7/1997 | Iizuka |
| 5,777,774 A | 7/1998 | Iizuka |
| 5,963,355 A | 10/1999 | Iizuka |
| 6,091,533 A | 7/2000 | Iizuka |

Primary Examiner—James Phan
(74) Attorney, Agent, or Firm—Greenblum & Bernstein, P.L.C.

(57) ABSTRACT

There is provided a scanning optical system, which is provided with a light source, a cylindrical lens that converges the beam emitted by the light source in an auxiliary scanning direction, a polygonal mirror, and an optical element that has a reflection surface to reflect the beam deflected by the polygonal mirror. The optical element converges the beam deflected by the polygonal mirror on the surface to be scanned to form a beam spot. In this case, the cylindrical lens is arranged such that the beam, which enters into the cylindrical lens and exits from the cylindrical lens without being reflected by inner surfaces of the cylindrical lens, is deflected in the auxiliary scanning direction by the cylindrical lens and is incident on the polygonal mirror.

15 Claims, 4 Drawing Sheets

SCANNING OPTICAL SYSTEM

BACKGROUND OF THE INVENTION

The present invention relates to a scanning optical system employed in a laser beam printer or the like. More specifically, the present invention relates to a scanning optical system which includes a curved reflection surface to reflect a laser beam deflected by a polygonal mirror and to direct the reflected laser beam to a surface to be scanned.

Conventionally, a scanning optical system includes a polygonal mirror which deflects a beam emitted by a laser diode to scan a surface to be scanned (e.g., a photoconductive surface of a photoconductive drum), and an fθ lens which converges the beam to form a scanning beam spot on the surface such that the scanning beam spot scans on the surface at a constant speed.

As the polygonal mirror rotates about its rotational axis, the beam spot moves on the surface to be scanned. Hereinafter, a direction, on the surface to be scanned, in which the beam spot moves as the polygonal mirror rotates is referred to as a main scanning direction. By ON/OFF modulating the beam spot as it moves in the main scanning direction, and by moving the surface to be scanned in a direction perpendicular to the main scanning direction, a two dimensional image can be formed on the surface. Hereinafter, the direction, on the surface to be scanned, perpendicular to the main scanning direction is referred to as an auxiliary scanning direction. Further, shape and direction of power of each optical element provided in the scanning optical system is described with reference to directions on the surface to be scanned.

A cylindrical lens which has a positive power only in the auxiliary scanning direction is also provided in the scanning optical system. The beam passed through the cylindrical lens is converged in the auxiliary scanning direction, and the converged beam is incident on a reflection surface of the polygonal mirror. Further, a power of the fθ lens in the auxiliary scanning direction is determined so that the reflection surface of the polygonal mirror and the surface to be scanned have a conjugate relationship. With this configuration, a facet error of the polygonal mirror can be corrected.

Recently, an optical scanning system, which uses a reflector having a curved reflection surface (which will be referred to as an fθ mirror hereinafter) in place of the fθ lens, has been provided. With this type of scanning optical system, it is expected that chromatic aberration is reduced. It is also expected that the size of the optical scanning system is reduced because of the bent configuration of an optical path. In general, in such a scanning optical system, a polygonal mirror whose thickness is reduced in order to achieve weight reduction thereof is employed.

The fθ mirror reflects the beam deflected by the polygonal mirror, and directs the beam to the surface to be scanned. The reflection surface of the fθ mirror is typically an anamorphic surface, which is symmetrical with respect to an auxiliary scanning plane including the rotational axis of the polygonal mirror and being perpendicular to the surface to be scanned.

Similar to the fθ lens, the fθ mirror has functions of maintaining the constant scanning speed of the beam spot on the surface to be scanned, correcting curvature of field both in the main scanning direction and in the auxiliary scanning direction, and correcting the facet error of the polygonal mirror.

In the scanning optical system employing the fθ mirror, the light source, the polygonal mirror, and the fθ mirror are arranged such that the beam incident on the polygonal mirror travels in the auxiliary scanning plane, in order to prevent occurrence of aberration caused by the reflection surface of the fθ mirror.

FIG. 1 shows a typical configuration of a conventional scanning optical system which uses an fθ mirror 5. As shown in FIG. 1, a laser beam emerging from a cylindrical lens 3 is reflected by a polygonal mirror 4, and travels in the reverse direction. Then, the laser beam is reflected by the fθ mirror 5, and is directed to a photoconductive drum 11.

Travel of the laser beam in the cylindrical lens 3 will be described in detail. As shown in FIG. 1, the laser beam emitted by a light source (not shown) enters the cylindrical lens 3 through a cylindrical surface 3a, exits from a planar surface 3b, and travels to the polygonal mirror 4 along an optical path Ax. Generally, a collimating lens is arranged between the light source and the cylindrical lens 3. Accordingly, a collimated laser beam is incident on the cylindrical lens 3.

When the laser beam emitted by the laser source is incident on the cylindrical surface 3a, most part of the laser beam passes through the cylindrical surface 3a and exits from the planar surface 3b. However, a remaining part of the laser beam is reflected by the planar surface 3b. Further, the part of the laser beam reflected by the planar surface 3b is partially reflected by the cylindrical surface 3a, thereby stray light G being generated and emerging from the planar surface 3b.

Since the stray light G is converged twice by the cylindrical surface 3a, it converges on a point between the cylindrical lens 3 and the polygonal mirror 4, and is incident on the polygonal mirror 4 as a diverging beam.

As can be seen in FIG. 1, a portion of the stray light G is deflected by the polygonal mirror 4, and therefore, the portion of the stray light scans on the photoconductive drum 11. It is understood that the portion of the stray light G scanning on the photoconductive drum 11 does not affect the quality of an image formed on a photoconductive surface of the photoconductive drum 11 substantially because it is very weak and does not stay on the same position on the photoconductive surface.

On the contrary, most part of the stray light G passes by the polygonal mirror 4 and is directly incident on the photoconductive drum 11. That is because the thickness of the polygonal mirror 4 is reduced in order to achieve weight reduction thereof. The stray light G directly incident on the photoconductive drum 11 affects the quality of an image since, although it is very weak, the stray light G directly incident on the photoconductive drum 11 is not deflected by the polygonal mirror 4 and stays on the same position on the photoconductive surface.

SUMMARY OF THE INVENTION

The present invention is advantageous in that it provides a scanning optical system, which is capable of preventing deterioration of the quality of an image formed on a surface to be scanned due to the stray light generated by the cylindrical lens.

According to an aspect of the invention, there is provided a scanning optical system for emitting a beam scanning in a main scanning direction. The scanning optical system is provided with a light source that emits a beam, a cylindrical lens that converges the beam emitted by the light source in an auxiliary scanning direction which is perpendicular to the main scanning direction, a polygonal mirror that rotates and deflects the beam emerged from the cylindrical lens to scan in the main scanning direction, and an optical element that has a reflection surface to reflect the beam deflected by the polygonal mirror. The optical element is configured to converge the beam deflected by the polygonal mirror to form a beam spot on a surface to be scanned, and to enable the beam spot to scan on the surface to be scanned at a constant speed. In this case, the cylindrical lens is arranged such that a central axis of the beam, which enters into the cylindrical lens and exits from the cylindrical lens without being reflected by inner surfaces of the cylindrical lens, is deflected in the auxiliary scanning direction by the cylindrical lens and is incident on the polygonal mirror.

With this configuration, it becomes possible to prevent a portion of the light beam, which is reflected by the inner surfaces of the cylindrical lens a plurality of times and exits from the cylindrical lens, from being directed to the surface to be scanned.

In a particular case, an optical axis of the cylindrical lens may be shifted in the auxiliary scanning direction with respect to the central axis of the beam traveling from the cylindrical lens to the polygonal mirror.

In a particular case, a central axis of a portion of the beam, which is reflected by inner surfaces of the cylindrical lens a plurality of times and exits from a side of the cylindrical lens facing the polygonal mirror, may be inclined in the auxiliary scanning direction with respect to the beam traveling from the cylindrical lens to the polygonal mirror.

Optionally, the scanning optical system may be provided with a light shield that is placed on an optical path of the portion of the beam and blocks travel of the portion of the beam.

Preferably, the central axis of the beam traveling from the cylindrical lens to the polygonal mirror may be inclined with respect to a plane which is perpendicular to a rotational axis of the polygonal mirror.

Optionally, the optical element may be positioned between the cylindrical lens and the polygonal mirror when the scanning optical system is viewed from a line parallel with the rotational axis of the polygonal mirror, and may be placed at a distance from the beam traveling from the cylindrical lens to the polygonal mirror.

In a particular case, the cylindrical lens may be arranged such that a cylindrical surface thereof is facing the light source.

Optionally or alternatively, the cylindrical lens may have a cylindrical surface and a planar surface.

In a particular case, the reflection surface of the optical element may be formed on a rear side of the optical element. In this case, the rear side is opposite to a front side of the optical element facing the polygonal mirror.

In a particular case, stray light may be generated inside the cylindrical lens due to inner reflection thereof. In this case, the stray light is emitted from the cylindrical lens on the same side where the beam directed to the polygonal mirror emerges, and the cylindrical lens is arranged so that the stray light is spatially separated from the beam directed to the polygonal mirror.

According to another aspect of the invention, there is provided a scanning optical system, which is provided with a light source that emits a beam, a cylindrical lens that converges the beam emitted by the light source in an auxiliary scanning direction, a polygonal mirror that deflects the beam from the cylindrical lens to scan within a predetermined angular range, and an fθ mirror that converges the scanning beam on a surface to be scanned. In this case, stray light is generated inside the cylindrical lens due to inner reflection thereof, and the stray light is emitted from the cylindrical lens on the same side where the beam directed to the polygonal mirror emerges. Further, the cylindrical lens is arranged so that the stray light is spatially separated from the beam directed to the polygonal mirror.

Optionally, an optical axis of the cylindrical lens may be shifted with respect to a central axis of the laser beam incident on the cylindrical lens.

Still optionally, an optical axis of the cylindrical lens may be inclined with respect to a central axis of the laser beam incident on the cylindrical lens.

In a particular case, a degree of separation of the stray light with respect to the beam directed to the polygonal mirror may be changeable depending on the arrangement of the cylindrical lens.

In a particular case, the scanning optical system may include a light shielding member which blocks the stray light.

BRIEF DESCRIPTION OF THE ACCOMPANYING DRAWINGS

Figure 4:
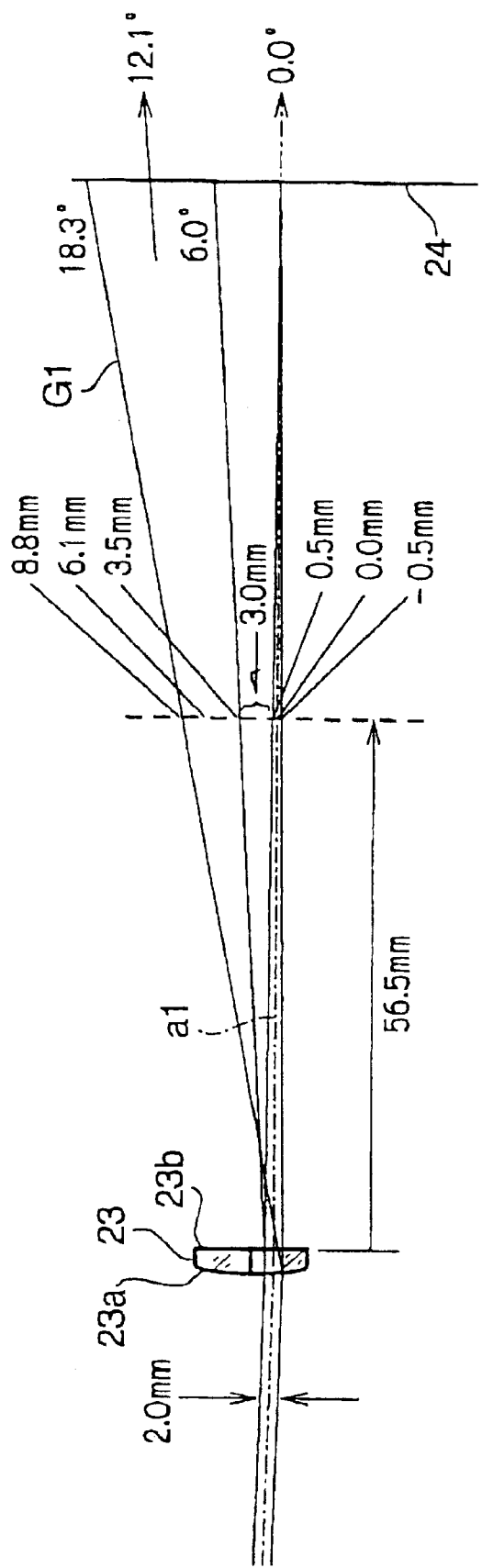

FIG. 4 schematically shows optical paths of a laser beam exiting from the cylindrical lens without being reflected by inner surfaces thereof and a stray light exiting from the cylindrical lens.

DETAILED DESCRIPTION OF THE EMBODIMENTS

An embodiment according to the present invention will be described with reference to the accompanying drawings.

Figure 2:
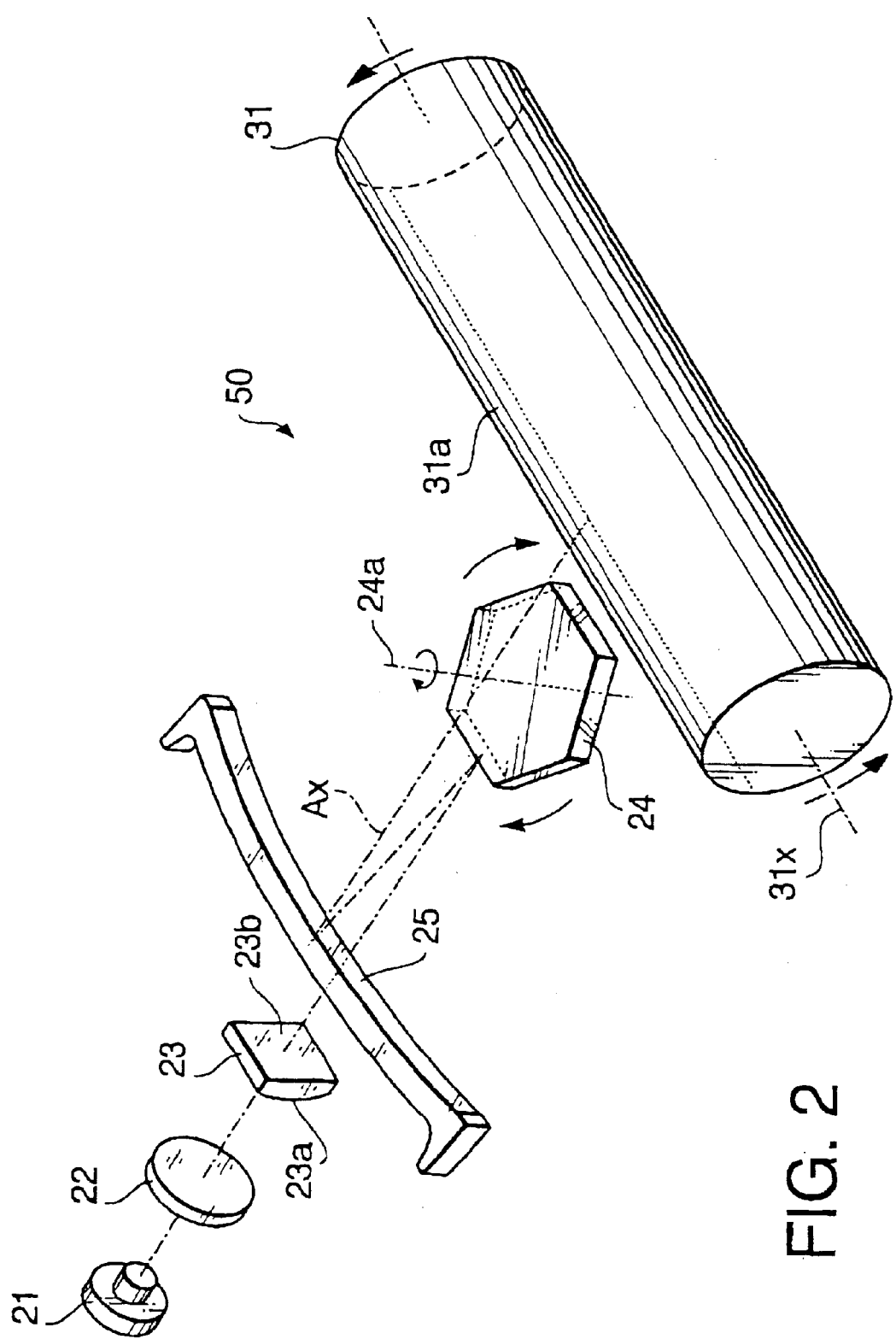
FIG. 2 is a perspective view of a scanning optical system according to an embodiment of the invention.

FIG. 2 is a perspective view of a scanning optical system 50 according to an embodiment of the invention. The scanning optical system 50 includes a laser diode 21 which emits a laser beam, a collimating lens 22, a cylindrical lens 23, a polygonal mirror 24 which deflects the laser beam impinging thereon, and an fθ mirror 25 which reflects the laser beam deflected by the polygonal mirror 24 and converges the laser beam on a photoconductive surface of the photoconductive drum 31.

The collimating lens 22 collimates the laser beam emitted by the laser diode 21. The cylindrical lens 23 includes a cylindrical surface 23a and a planar surface 23b. The thickness (i.e., the length along the rotational axis 24a) of the polygonal mirror 24 is very small. The polygonal mirror 24 is configured to rotate about its rotational axis 24a at a constant angular speed.

Figure 3:
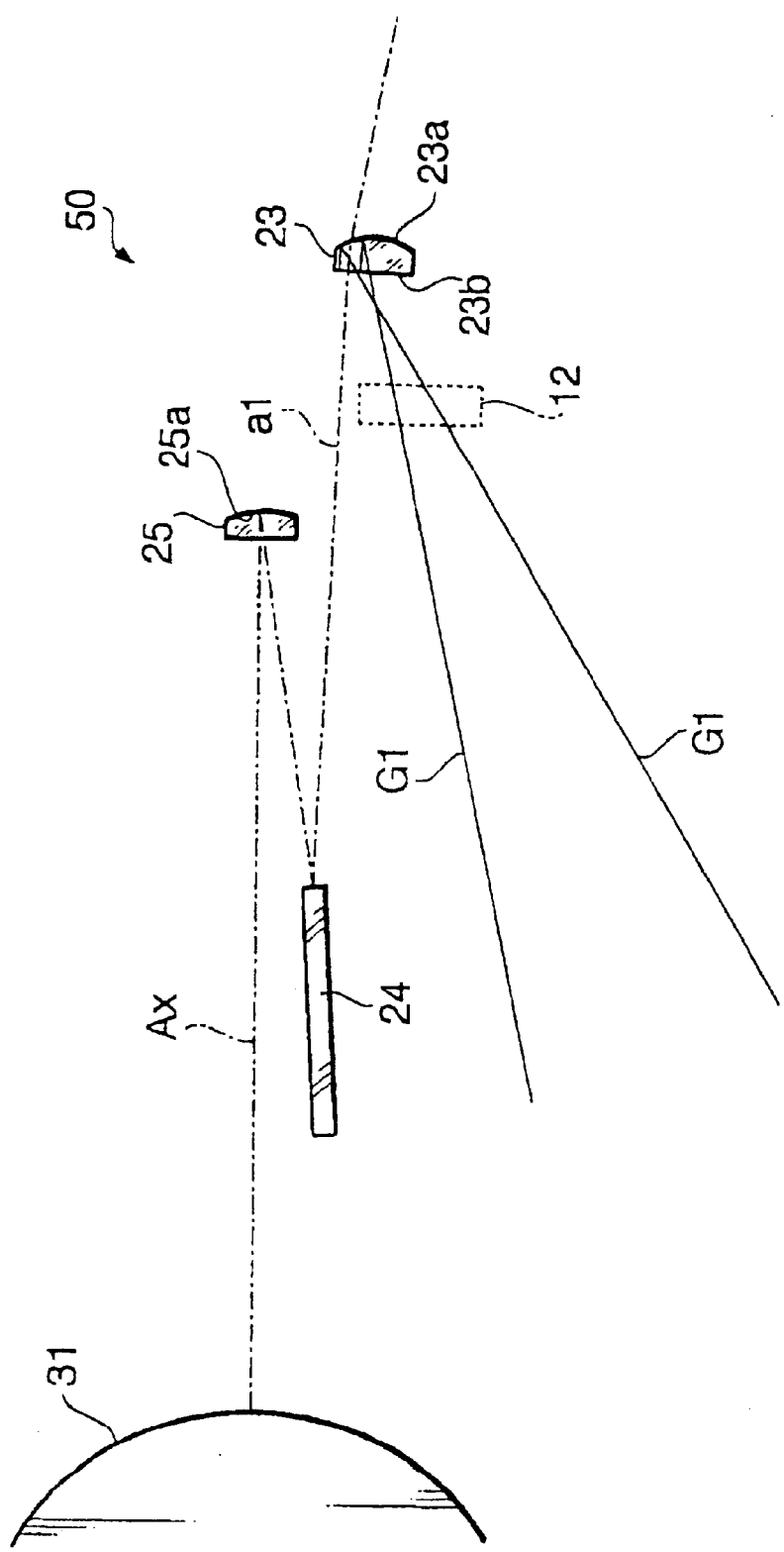
FIG. 3 is a side view of the scanning optical system shown in FIG. 2.

The fθ mirror 25 has an anamorphic reflection surface 25a (see FIG. 3). The reflection surface 25a of the fθ mirror 25 is symmetrical with respect to an auxiliary scanning plane (not shown) including the rotational axis 24a of the polygonal mirror 24 and a laser beam which is deflected by the polygonal mirror 24 and reaches at a center of the scanning range in the main scanning direction. In this embodiment, a surface to be scanned is a photoconductive surface 31a of the photoconductive drum 31 whose rotational axis 31x is perpendicular to the auxiliary scanning plane.

The laser beam exiting from the planar surface 23b travels to the polygonal mirror 24 in the auxiliary scanning plane. The laser beam impinging on a reflection surface of the polygonal mirror 24 is deflected and is directed to the fθ mirror 25. The fθ mirror 25 converges the laser beam to form a scanning beam spot on the photoconductive surface 31a. Further, the fθ mirror 25 is designed such that the scanning beam spot scans on the photoconductive surface 31a at a constant speed.

If the scanning optical system 50 is viewed from an upper position along the rotational axis 24a, the fθ mirror 25 is located between the cylindrical lens 23 and the polygonal mirror 24. Further, the fθ mirror 25 and the photoconductive drum 31 are placed on the opposite sides of the polygonal mirror 24.

If the scanning optical system 50 is viewed from a side position along the main scanning direction, the fθ mirror 25 is arranged above the laser beam traveling from the cylindrical lens 23 to the polygonal mirror 24. Further, the photoconductive drum 31 is arranged such that the laser beam which is reflected from the fθ mirror 25 and passes by the polygonal mirror 24 impinges on the photoconductive drum 31.

In FIG. 2, a condition where one of reflection surfaces of the polygonal mirror 24 is perpendicular to the auxiliary scanning plane is shown. In this condition, an optical path Ax is bent in the auxiliary scanning plane, and therefore, it has the form of a letter Z viewed from the side.

The cylindrical lens 23 has a positive power only in the auxiliary scanning direction. Due to the refraction power of the cylindrical lens 23, the laser beam is converged only in the auxiliary scanning direction, and therefore, a line-like image, which extends in the main scanning direction, is formed on a plane closely adjacent to a reflection surface of the polygonal mirror 24. Then, the laser beam reflected from the polygonal mirror 4 diverges in the auxiliary scanning direction and travels to the fθ mirror 25. The fθ mirror 25 converges the laser beam in the auxiliary scanning direction and in the main scanning direction to form the scanning beam spot on the photoconductive surface.

It should be noted that the reflection surface of the polygonal mirror 24 and the surface to be scanned are conjugate with respect to each other. Therefore, adverse effects (e.g., a deviation of the scanning beam spot in the auxiliary scanning direction from a proper position) due to the facet error of the polygonal mirror 24 can be avoided.

Since the photoconductive drum 31 is rotated about its rotational axis 31x, a plurality of scan lines are formed on the photoconductive surface 31a of the photoconductive drum 31 at constant intervals. In this case, by ON/OFF modulating the beam spot as the beam spot moves in the main scanning direction, a two dimensional latent image can be formed on the photoconductive surface 31a.

The position of the cylindrical lens 23 in the scanning optical system 50 will be described in detail below with reference to FIG. 3, which is a side view of the scanning optical system 50. In FIG. 3, the shape of the optical path Ax is exaggerated for purpose of illustration.

As shown in FIG. 3, an optical axis of the cylindrical lens 23 is decentered (i.e., shifted) by a certain amount in the auxiliary scanning direction with respect to an optical path a1 (a portion of the optical path Ax) which lies between the cylindrical lens 23 and the polygonal mirror 24. In this case, the angle, which is formed between the central axis of the laser beam exiting from the collimating lens 22 and the optical path a1, is adjusted according to the amount of the shift of the cylindrical lens 23 so that the laser beam exiting from the cylindrical lens 23 travels along the optical path Ax.

It should be noted that stray light G1 is inclined in the downward direction (i.e., in the auxiliary scanning direction) with respect to the optical path a1 because the cylindrical lens 23 is shifted in the downward direction with respect to the optical path a1. The angle between a central axis of the stray light G1 and the optical path a1 varies according to the amount of the shift of the cylindrical lens 23 in the auxiliary scanning direction. In addition, a direction in which the stray light G1 deviates from the optical path a1 is the same direction in which the cylindrical lens 23 is shifted. Therefore, by adjusting the amount of the shift of the cylindrical lens 23 and/or the direction in which the cylindrical lens 23 is shifted, the direction in which the stray light G1 deviates from the optical path a1 can be changed. Accordingly, it is possible to prevent the stray light G1 from being directed to the photoconductive drum 31.

Additionally, as shown in FIG. 3, a light shield member 12 may be placed such that it does not block the laser beam traveling along the optical path a1, but blocks the stray light G1. In this case, occurrence of a ghost image in the image formed on the photoconductive surface can be prevented completely.

As shown in FIG. 3, the fθ mirror 25 according to the embodiment is a reflector whose reflection surface is formed on the inner-rear surface of the reflector. Japanese Patent Provisional Publication No. HEI 11-242178 filed by the same applicant discloses an example of such a reflector.

Figure 1:
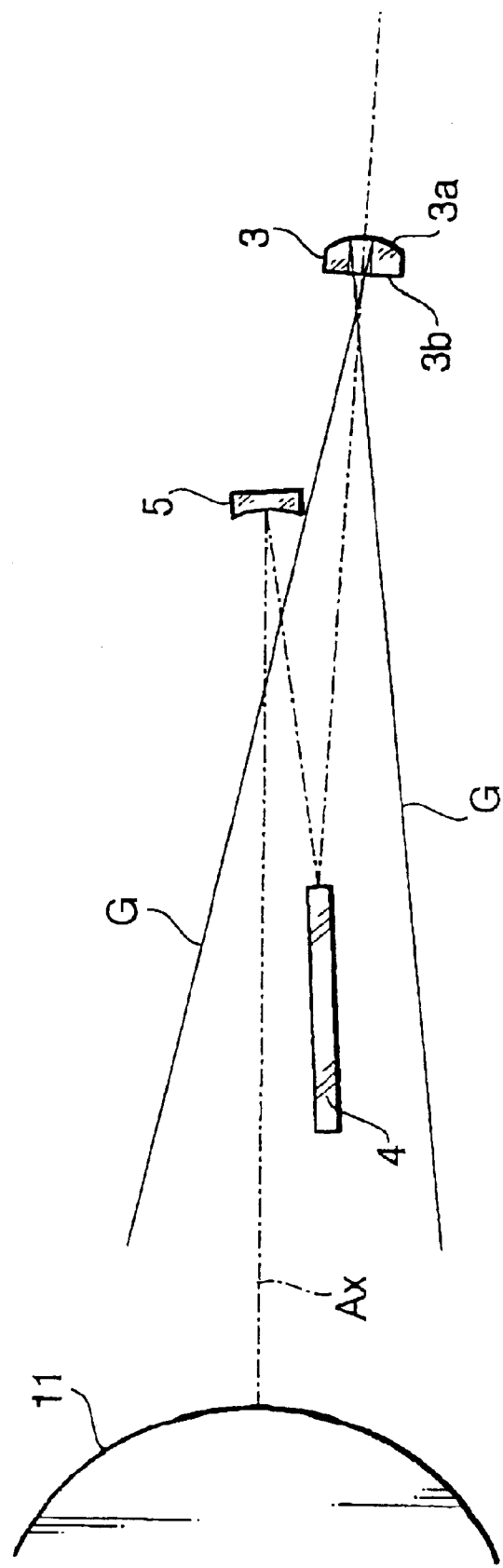
FIG. 1 shows a typical configuration of a conventional scanning optical system which uses an fθ mirror.

However, another type of the reflector whose reflection surface is formed on the front surface of the reflector may be used alternative to the fθ mirror 5. Japanese Patent Provisional Publication No. HEI 11-30710 filed by the same applicant discloses an example of such a reflector. In FIG. 1, such a reflector whose reflection surface is formed on the front surface of the reflector is shown.

Hereinafter, a concrete example of the scanning optical system 50 shown in FIGS. 2 will be described.

TABLE 1 indicates a numerical structure from the cylindrical surface 23a to the reflection surface of the polygonal mirror 24. In TABLE 1, surface #1 represents a surface (the cylindrical surface 23a) on which the laser beam is incident, and surface #2 represents the planar surface 23b of the cylindrical lens 23. Further, in TABLE 1, Ry denotes a radius (unit: mm) of curvature in the main scanning direction, Rz denotes a radius (unit: mm) of curvature in the auxiliary scanning direction, d denotes a distance between adjacent surfaces on the optical axis, n denotes a refractive index at a design wavelength of 780 nm.

TABLE 1

| Surface | Ry | Rz | D | N |
| --- | --- | --- | --- | --- |
| #1 | ∞ | 42.42 | 2.000 | 1.48617 |
| #2 | ∞ | ∞ | 113.000 | — |

In this case, if the amount of the shift of the cylindrical lens 23 in the auxiliary scanning direction is 2.0 mm, a deflection angle between the central axis of the stray light G1 and the optical path a1 is 12.1°. FIG. 4 shows this situation. It should be noted that, in FIG. 4, the cylindrical lens 23 is shifted in an upward direction which is opposite to the direction in which the cylindrical lens 23 is shifted in FIG. 3. In FIG. 4, a diameter of the laser beam entering the cylindrical lens 23 is 2.0 mm.

As shown in FIG. 4, the diameter of the laser beam traveling along the optical path a1 at a position of a imaginary line (a broken line shown in FIG. 4), which is spaced from the planar surface 23b of the cylindrical lens 23 by 56.5 mm, is 1.0 mm. Also, as shown in FIG. 4, on the imaginary line, the stray light G1 lies between positions spaced from the optical path a1 by 3.5 mm and 8.8 mm.

Since, on the imaginary line, the stray light G1 is spaced by 3.0 mm (3.5 mm−1.0 mm/2=3.0 mm) from the laser beam traveling along the optical path a1 (see FIG. 4), it becomes possible to arrange the light shield member 12, which blocks only the stray light G1, on an optical path of the stray light G1.

It should be noted that the invention is not limited to the configuration of the above-described embodiment, and various modifications of the above-mentioned embodiment can be made. Various types of elements which block travel of a laser beam may be used as the light shield member 12. The light shield member 12 may be formed as a portion of a housing which accommodates the scanning optical system 50.

As described above, according to the invention, it becomes possible to prevent the stray light which exits the cylindrical lens after it is reflected by the inner surfaces of the cylindrical lens a plurality of times from impinging on the scanning surface of the scanning optical system. Therefore, adverse effects on the quality of the image, for example, occurrence of ghosts in the image formed on the surface to be scanned, can be avoided.

The present disclosure relates to the subject matter contained in Japanese Patent Application No. 2001-306085, filed on Oct. 2, 2001, which is expressly incorporated herein by reference in its entirety.

What is claimed is:

1. A scanning optical system for emitting a beam scanning in a main scanning direction, comprising:
   a light source that emits a beam;
   a cylindrical lens that converges the beam emitted by said light source in an auxiliary scanning direction which is perpendicular to the main scanning direction;
   a polygonal mirror that rotates and deflects the beam emerged from said cylindrical lens to scan in the main scanning direction; and
   an optical element that has a reflection surface to reflect the beam deflected by said polygonal mirror, said optical element converging the beam deflected by said polygonal mirror on a surface to be scanned to form a beam spot, the beam spot scanning on the surface to be scanned,
   wherein said cylindrical lens is arranged such that the beam, which enters into said cylindrical lens and exits from said cylindrical lens without being reflected by inner surfaces of said cylindrical lens, is deflected in the auxiliary scanning direction by said cylindrical lens and is incident on said polygonal mirror.

2. The scanning optical system according to claim 1, wherein an optical axis of said cylindrical lens is shifted in the auxiliary scanning direction with respect to a central axis of the beam traveling from said cylindrical lens to said polygonal mirror.

3. The scanning optical system according to claim 2, wherein a central axis of a portion of the beam, which is reflected by inner surfaces of said cylindrical lens a plurality of times and exits from a side of said cylindrical lens facing said polygonal mirror, is inclined in the auxiliary scanning direction with respect to the beam traveling from said cylindrical lens to said polygonal mirror.

4. The scanning optical system according to claim 3, further comprising a light shield that is placed on an optical path of the portion of the beam and blocks travel of the portion of the beam.

5. The scanning optical system according to claim 1, wherein the central axis of the beam traveling from said cylindrical lens to said polygonal mirror is inclined with respect to a plane which is perpendicular to a rotational axis of said polygonal mirror.

6. The scanning optical system according to claim 5, wherein said optical element is positioned between said cylindrical lens and said polygonal mirror when said scanning optical system is viewed along a line parallel with the rotational axis of said polygonal mirror, and is placed at a distance from the beam traveling from said cylindrical lens to said polygonal mirror.

7. The scanning optical system according to claim 1, wherein said cylindrical lens is arranged such that a cylindrical surface thereof is facing said light source.

8. The scanning optical system according to claim 1, wherein said cylindrical lens has a cylindrical surface and a planar surface.

9. The scanning optical system according to claim 1, wherein the reflection surface of said optical element is formed on a rear side of said optical element, the rear side being opposite to a front side of said optical element facing said polygonal mirror.

10. The scanning optical system according to claim 1,
    wherein stray light is generated inside said cylindrical lens due to inner reflection thereof, the stray light being emitted from said cylindrical lens on the same side where the beam directed to said polygonal mirror emerges, and
    wherein said cylindrical lens is arranged so that the stray light is spatially separated from the beam directed to said polygonal mirror.

11. A scanning optical system, comprising:
    a light source that emits a beam;
    a cylindrical lens that converges the beam emitted by the light source in an auxiliary scanning direction;
    a polygonal mirror that deflects the beam from the cylindrical lens to scan within an predetermined angular range; and
    an fθ mirror that converges the scanning beam on a surface to be scanned,
    wherein stray light is generated inside said cylindrical lens due to inner reflection thereof, the stray light being emitted from said cylindrical lens on the same side where the beam directed to said polygonal mirror emerges, and
    wherein said cylindrical lens is arranged so that the stray light is spatially separated from the beam directed to said polygonal mirror.

12. The scanning optical system according to claim 11, wherein an optical axis of said cylindrical lens is shifted with respect to a central axis of the laser beam incident on said cylindrical lens.

13. The scanning optical system according to claim 12, wherein an optical axis of said cylindrical lens is inclined with respect to a central axis of the laser beam incident on said cylindrical lens.

14. The scanning optical system according to claim 11, wherein a degree of separation of the stray light with respect to the beam directed to the polygonal mirror is changeable depending on the arrangement of said cylindrical lens.

15. The scanning optical system according to claim 11, further includes a light shielding member which blocks the stray light.

* * * * *